(12) United States Patent
Martin et al.

(10) Patent No.: US 11,460,040 B2
(45) Date of Patent: Oct. 4, 2022

(54) FAN BLADE

(71) Applicant: Safran Aircraft Engines, Paris (FR)

(72) Inventors: Guillaume Olivier Vartan Martin, Cesson (FR); Alexandre Bernard Marie Boisson, Moissy Cramayel (FR); Claire Marie Figeureu, Fontainebleau (FR); Frederic Alain Edouard Allair, Garches (FR); Thea Claire Lancien, Toulouse (FR)

(73) Assignee: SNECMA, Paris (FR)

( * ) Notice: Subject to any disclaimer, the term of this patent is extended or adjusted under 35 U.S.C. 154(b) by 865 days.

(21) Appl. No.: 15/548,040

(22) PCT Filed: Feb. 4, 2016

(86) PCT No.: PCT/FR2016/050234
§ 371 (c)(1),
(2) Date: Aug. 1, 2017

(87) PCT Pub. No.: WO2016/124861
PCT Pub. Date: Aug. 11, 2016

(65) Prior Publication Data
US 2018/0010613 A1 Jan. 11, 2018

(30) Foreign Application Priority Data

Feb. 6, 2015 (FR) ..................................... 1550965

(51) Int. Cl.
*F04D 29/38* (2006.01)
*F04D 29/32* (2006.01)
(Continued)

(52) U.S. Cl.
CPC ........... *F04D 29/384* (2013.01); *F01D 5/141* (2013.01); *F04D 29/023* (2013.01);
(Continued)

(58) Field of Classification Search
CPC .......... F01D 5/141; F02K 3/06; F04D 29/023; F04D 29/324; F04D 29/325; F04D 29/34;
(Continued)

(56) References Cited

U.S. PATENT DOCUMENTS 2,830,753 A * 4/1958 Stalker .................. F04D 29/324
415/222
2015/0152880 A1* 6/2015 Reiss ...................... F01D 5/141
416/229 A
(Continued)

FOREIGN PATENT DOCUMENTS

WO WO 2013/178914 A1 12/2013

OTHER PUBLICATIONS

International Search Report dated May 11, 2016 in PCT/FR2016/050234 (with English translation).

*Primary Examiner* — Grant Moubry
*Assistant Examiner* — Ruben Picon-Feliciano
(74) *Attorney, Agent, or Firm* — Oblon, McClelland, Maier & Neustadt, L.L.P.

(57) ABSTRACT

A blade including at least one web and a vane having a leading edge and a trailing edge, wherein, for at least one aerofoil of the vane in the vicinity of the web, a maximum sweep angle associated with a position along a chord of the aerofoil extending from the leading edge to the trailing edge of the vane corresponding to a relative chord length of at least 50%.

11 Claims, 6 Drawing Sheets

(51) Int. Cl.
  *F04D 29/54* (2006.01)
  *F04D 29/02* (2006.01)
  *F01D 5/14* (2006.01)
  *F04D 29/34* (2006.01)
  *F02K 3/06* (2006.01)

(52) U.S. Cl.
  CPC ......... *F04D 29/324* (2013.01); *F04D 29/325* (2013.01); *F04D 29/34* (2013.01); *F04D 29/38* (2013.01); *F04D 29/388* (2013.01); *F04D 29/544* (2013.01); *F02K 3/06* (2013.01); *F05D 2220/36* (2013.01); *F05D 2240/304* (2013.01); *F05D 2300/603* (2013.01); *F05D 2300/6012* (2013.01)

(58) Field of Classification Search
  CPC ...... F04D 29/38; F04D 29/384; F04D 29/388; F04D 29/544; F05D 2220/36; F05D 2240/304; F05D 2300/603; F05D 2300/6012
  See application file for complete search history.

(56) References Cited

U.S. PATENT DOCUMENTS

2016/0032939 A1* 2/2016 Anderson ............... B29C 70/34
                                                            416/230
2016/0194962 A1* 7/2016 Cojande ............... F04D 29/544
                                                            415/208.1

* cited by examiner

FAN BLADE

GENERAL TECHNICAL FIELD

The present invention relates to a fan blade.

PRIOR ART

Figure 1:
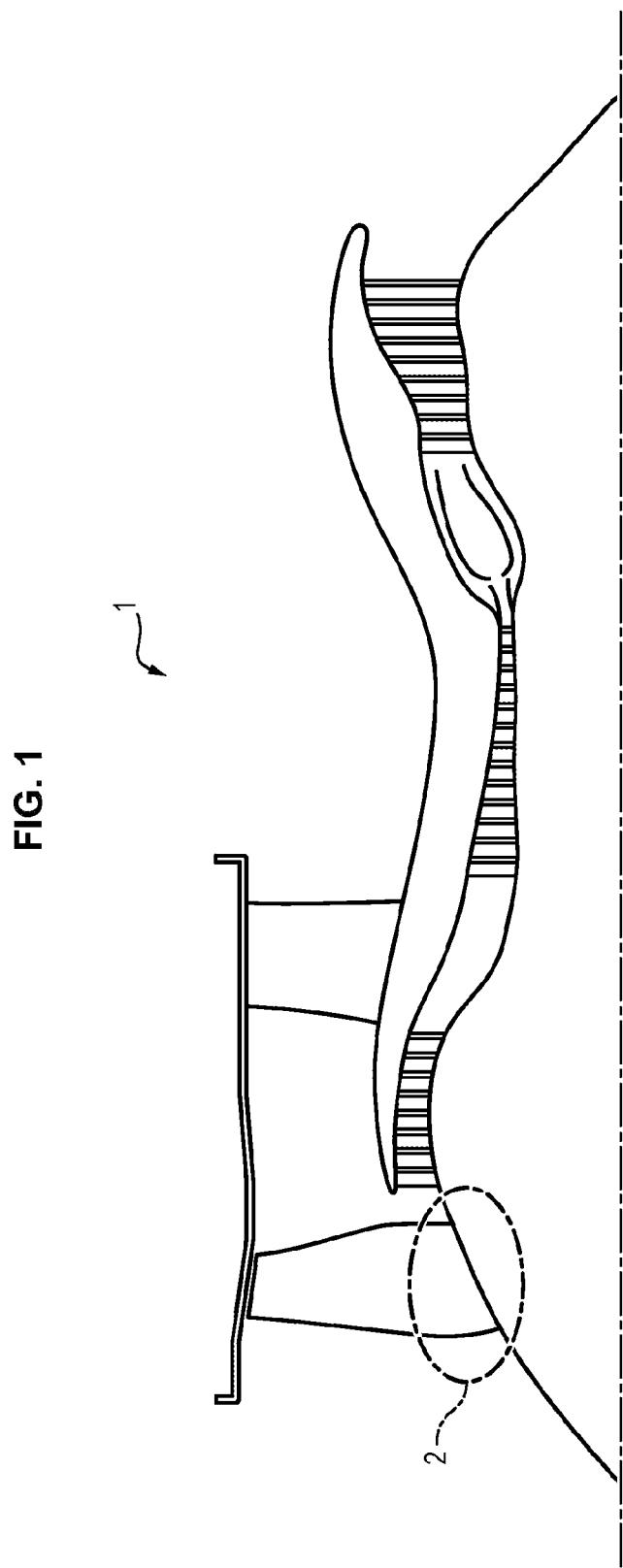
Figure 2:
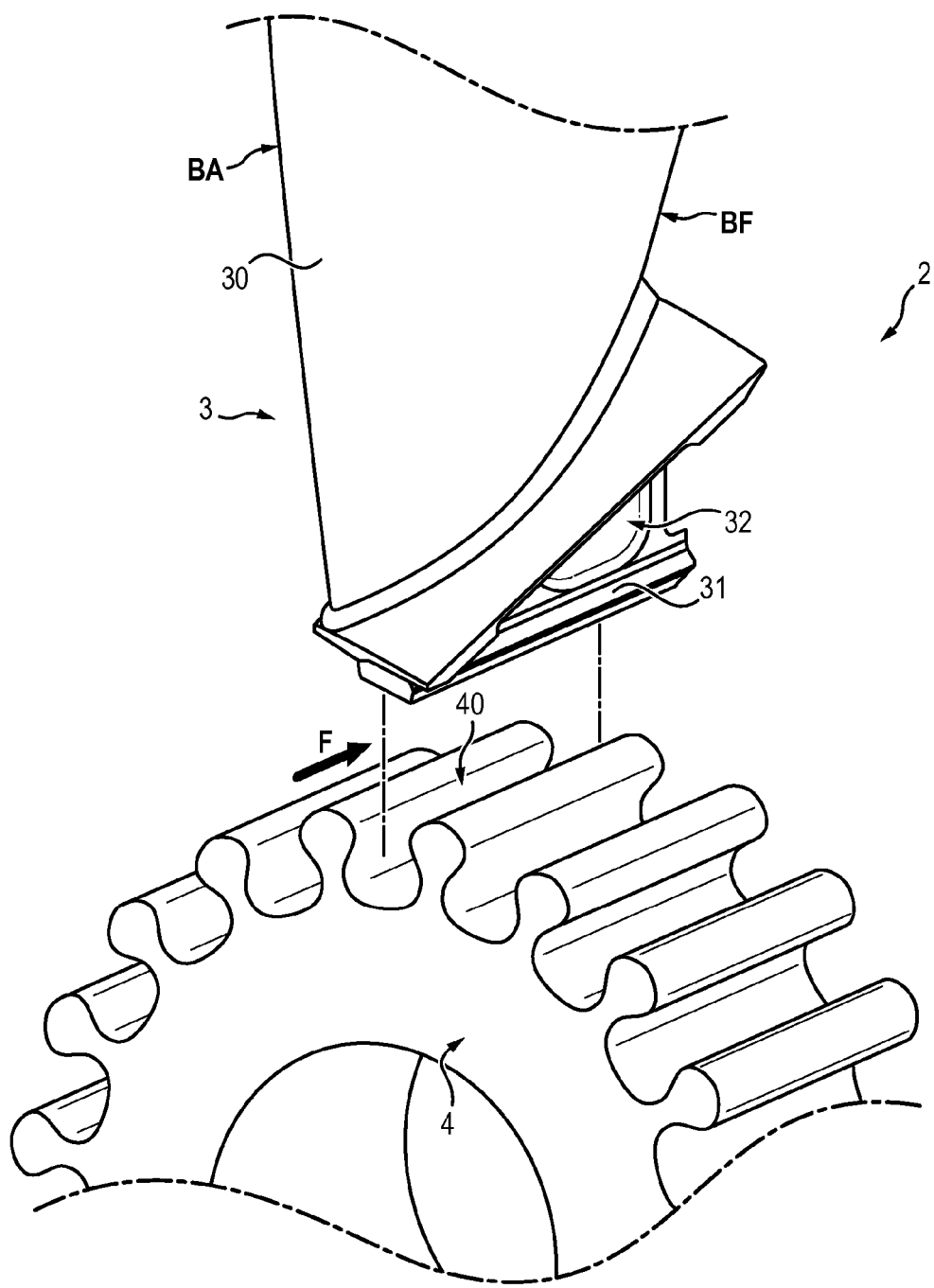

A fan is a large-diameter rotating part at the inlet of a bypass turbine engine (see the left side of FIG. 1) formed by a substantially conical hub (the "spinner") to which blades extending radially are attached, as can be seen in FIG. 2. The fan compresses a large mass of cold air, part of it injected into the compressor, the rest forming a cylindrical flow surrounding the engine and directed rearward to create thrust.

One development axis for improving the efficiency of future turbine engines is an increase in their dilution ratio, i.e. the ratio between the mass of air in the cold flow (i.e. the flow passing only through the fan) and that of the hot flow (that passing through the fan which is injected into the compressor and heated in the combustion chamber).

To this end, one of the paths is the reduction of the hub ratio, i.e. the ratio between the leading edge radius of the fan, measured at the intersection with the stream at the hub, and the radius measured at the casing at the same axial station. At the same fan diameter, this thus consists of a reduction of the hub diameter, which at present causes numerous mechanical and aerodynamic problems.

In fact, the work of the fan is accomplished by the deflection of the fluid. To compress the fluid, two options exist:

Make use of the tangential speed of the blade;
Curve the aerofoils.

On blades with a low hub ratio, the inner stream (that which corresponds to the air flow injected into the compressor) is very close to the axis of the engine. Its tangential speed is low; the work must therefore be carried out by camber. However, 3D-woven composite technology does not allow a rapid variation of angle. As can be seen in FIG. 2, the root is designed straight due to manufacturing problems connected to the woven composite), it not possible to retrieve the aerofoil of the blade at the inner stream using a conventional design.

Curving therefore also remains limited.

It would be desirable to have a new fan blade geometry which would allow maximum efficiency and performance without complicating production of the blades or weakening them.

PRESENTATION OF THE INVENTION

The present invention thus proposes a blade comprising at least one shank and a vane having a leading edge and a trailing edge, characterized in that it has, for at least one aerofoil of the vane in the vicinity of the shank, a maximum camber associated with a position along a chord of the aerofoil extending from the leading edge to the trailing edge of the vane corresponding to a relative chord length of at least 50%.

This particular geometry of the vane makes it possible to increase the curvature of the aerofoil while facilitating the connection of the straight woven root for the blade.

According to other advantageous and non-limiting features:

said position along the chord of the aerofoil associated with the maximum camber corresponds to a relative chord length comprised between 50% and 70%;
said position along the chord of the aerofoil associated with the maximum camber corresponds to a relative chord length comprised between 55% and 65%;
said maximum camber defines a point of a skeleton of the aerofoil extending from the leading edge to the trailing edge of the vane at which a distance with said chord of the aerofoil is a maximum;
the blade is made of a woven composite material;
the blade further comprising a root extending axially, the root being connected to the vane by means of the shank.

According to a second aspect, the invention relates to a fan for a bypass turbine engine comprising at least one blade according to the first aspect of the invention.

According to other advantageous and non-limiting features:

the fan comprises a disk from which said blade extends substantially radially;
the root of the blade is inserted axially into a pocket recess of the disk;
the fan comprises a plurality of blades according to the first aspect of the invention positioned regularly over a circumference of the disk.

According to a third aspect, the invention relates to a turbine engine comprising a fan according to the second aspect of the invention.

PRESENTATION OF THE FIGURES

Figure 3A:
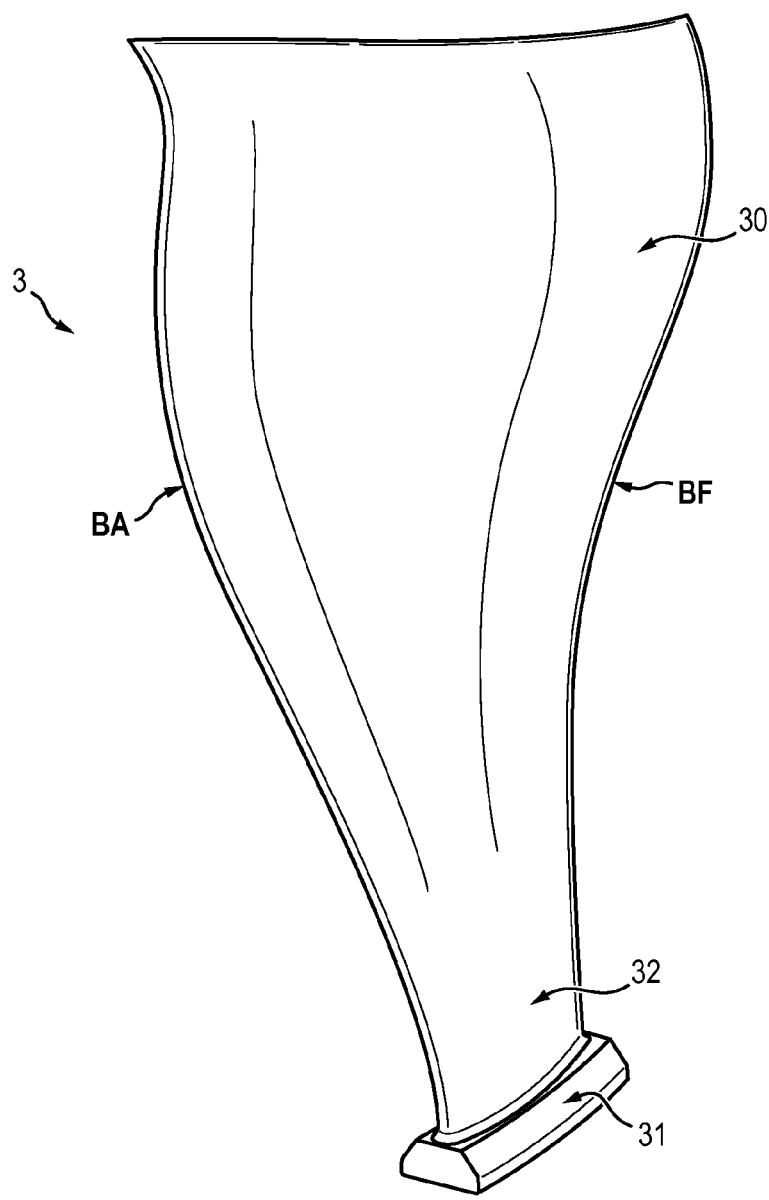
Figure 3B:
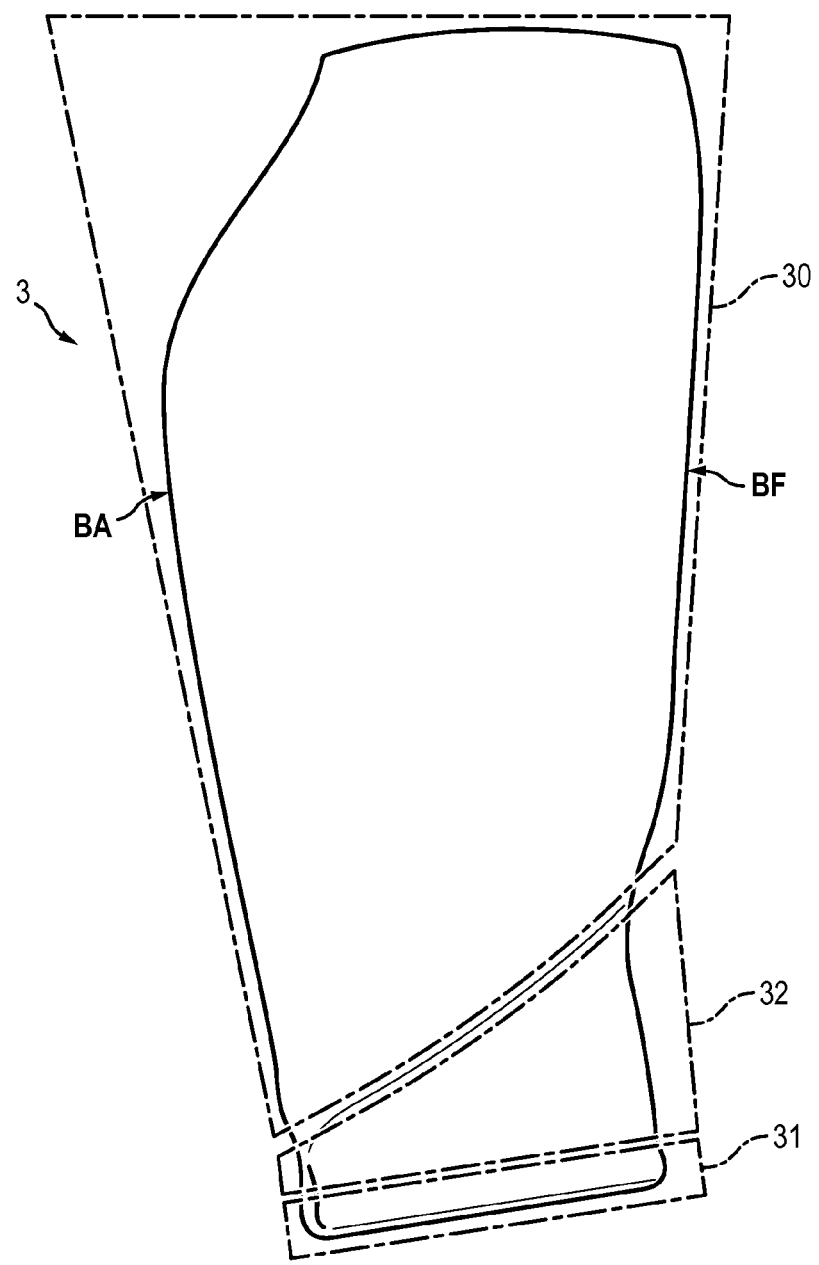
Figure 4:
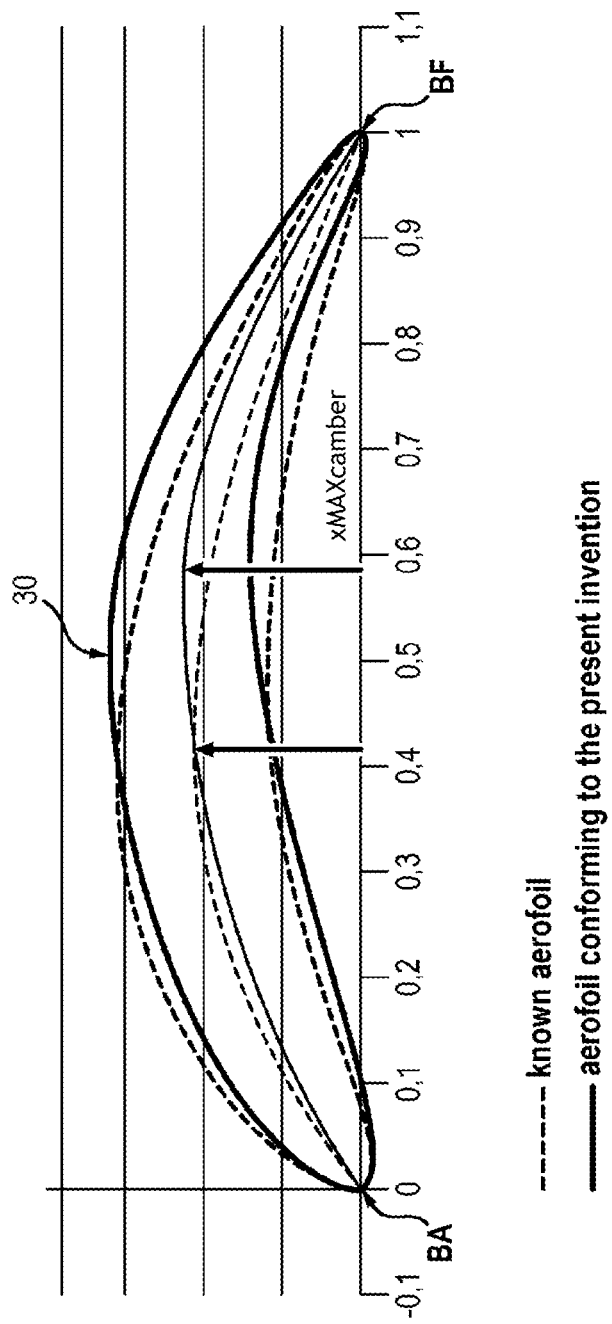
Figure 5:
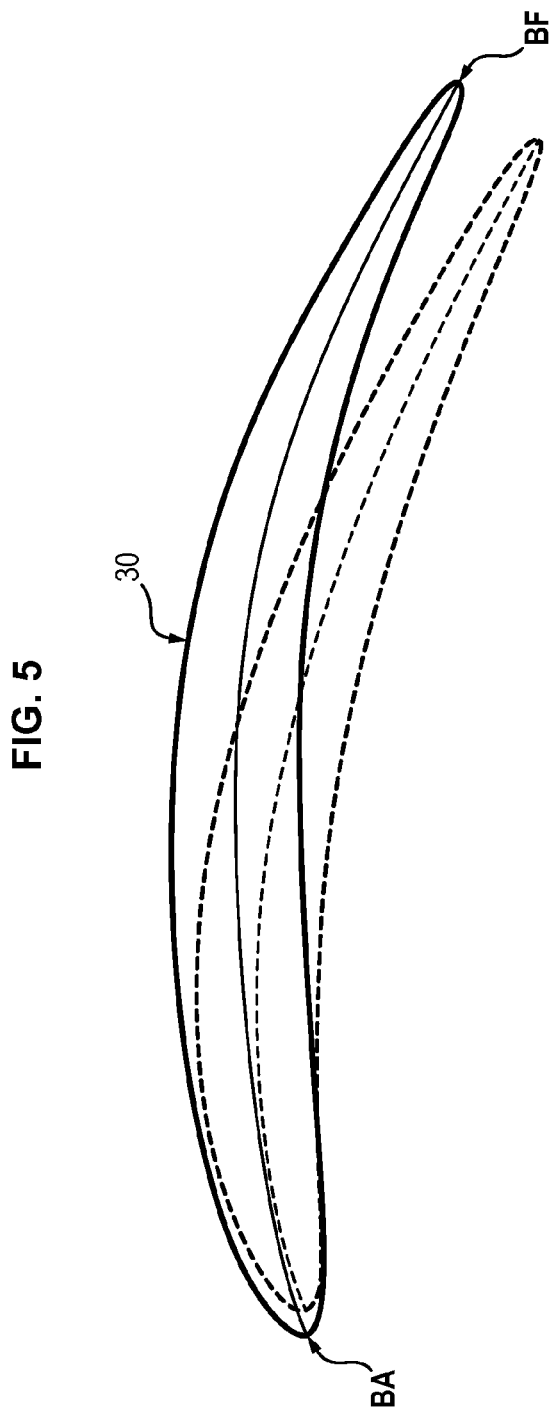

Other characteristics and advantages of the present invention will appear upon reading the description that follows of a preferred embodiment. This description will be given with reference to the appended drawings, wherein:

FIG. 1 previously described shows an example of a turbine engine;
FIG. 2 previously described illustrates a fan;
FIGS. 3a and 3b show a fan blade;
FIGS. 4 and 5 each compare an aerofoil of a known vane with an aerofoil of a vane according to the invention.

DETAILED DESCRIPTION

With reference to FIGS. 2, 3a and 3b, the present blade 3 is a blade of a fan 2 of a bypass turbine engine 1, constituted in known fashion of a vane 30, a shank 32 and a root 31 formed by a portion of greater thickness, having for example a section in the shape of a bulb. The shank 32 is the portion which ensures continuity between the vane 30 and the root 31 of the blade 3. This portion is situated below the stream and therefore has no significance for aerodynamics, but is crucial from the mechanical point of view because it will take up strong stresses, connected in particular with the centrifugal forces. The root 31 is a straight (so-called "axial") portion which is inserted by translation into a complementary-shaped pocket recess 40 of a disk 4 forming the hub of the fan 2.

It will be understood that the vane 30 is in contact with the fluid compressed by the fan 2, unlike the shank 32 which is "buried." The shank is a substantially planar, thin portion extending along said axial direction of the root 31. The shank, considering its longitudinal section in a radial plane of the blade, this plane passing through the axis of rotation of the fan, has a generally triangular shape.

The vane 30 has, at least in the vicinity of the root 31 (more precisely at the shank 32), i.e. at the base of the vane 30, a particular geometry which will be described below.

The present fan 2 is an assembly of parts comprising a platform from which the vanes 30 extend (this platform can either be a portion of the blades, in the form of two "integrated" half-platforms extending from the shanks 32 (as can be seen in FIG. 2), or be a portion of the hub 4 into which the blades are inserted, and in this case they are "attached"), which are advantageously arranged regularly over the circumference of the hub 4. The term platform is interpreted here in the broad sense and designates generally any element from which vanes extend radially and having a wall against which air circulates. High-performance platform geometries are now known which are non-axisymmetrical.

It will be understood that the present fan 2 is not limited to any particular platform structure, but the particular example of an attached platform, i.e. one associated with a blade 3 "without a platform" of the type of FIG. 3b will be assumed, comprising as explained a shank 32 having a reduced thickness with respect to the rest of the root 31 and a root 31 inserted into a pocket recess of a disk, so as to ensure the locking of the blade 3.

The blades 3 are preferentially made of a woven composite material. The root 31 is woven flat, i.e. it extends axially. A person skilled in the art can find, in particular in document EP1526285, examples of such materials and associated blade manufacturing methods.

The present blade 3 is distinguished, as explained, by a particular geometry of the vane 30 at the platform, i.e. at the junction point with the shank 32 in the example mentioned above. FIG. 4 shows a detail of two "sections" at this level of the vane 30 (note the concave-convex aerofoil) which extend from a leading edge BA toward a trailing edge BF, one conforming to a known geometry and the other conforming to the present invention. By section is meant a substantially transverse section of the vane 30 at a given height, following a streamline in particular.

It will be understood that the vane 30 has this geometry at least in the vicinity of the shank 32 (the proximal end of the vane 30, i.e. section height near 0), but not necessarily in the upper portion, approaching its distal end. Advantageously, the vane 30 has this geometry over less than 5% of its height, advantageously approximately 2% of its height.

The "chord," i.e. the straight line which connects the end points (BA and BF) of the section, should be noted in FIG. 4. This chord will serve, as will be seen later, as a reference frame for locating points along the section for characterizing the present geometry. Also seen in FIG. 4 is a mean line, the "skeleton" of the vane 30 (recall that the skeleton is the line connecting the leading edge BA to the trailing edge BF, which is located equidistantly from the lower surface and the upper surface). Orthogonally to a section is found the "height" of the above-mentioned vane 30.

The position of a point in the section is expressed as a function of the length of the chord (as the abscissa), and more precisely the length of the "normalized" chord, i.e. expressed between 0 and 1 when crossing the vane 2, to be traveled to attain the (orthogonal) projection of this point on the chord. This corresponds in other words to the x coordinate which a point of the section would have in an orthonormal reference frame wherein the point BA would have the coordinates (0,0), and the point BF (0,1). For example, a point in the section associated with a normalized chord length of "0.5" is on the midpoint of the chord.

In this reference frame, the coordinate y defines the distance from a point to the chord (distance between this point and its projection on the chord). For a point on the skeleton, this distance is called the camber. The point on the skeleton most distant from the chord thus represents the maximum camber. FIG. 4 thus shows the maximum camber of a known aerofoil and the maximum camber of an aerofoil conforming to the present invention. The point on the skeleton having the greatest camber of the aerofoil is commonly designated (for brevity) the maximum camber.

As can be seen in this figure, the innovation here consists of deferring downstream the maximum camber of the vane 30 (i.e. the point in the skeleton having the greatest camber of the aerofoil). More precisely, while the prior art situated the maximum camber near 40% of chord, the present geometry of the vane 30 situates it beyond 50% of chord, and in particular beyond 55% of chord.

In other words, the maximum camber is associated with a position along a chord of the aerofoil extending from the leading edge BA toward the trailing edge BF of the vane 30 corresponding to a relative chord length of at least 55%. Advantageously, the camber being maximum on the skeleton toward the downstream side of the blade with respect to the flow, the curvature of the blade is maximum toward the downstream side of the blade, with an offset toward the trailing edge, considering this curvature to be in proximity to the platforms of the fan, to the junction between the shanks and the blades. The hub ratio is favorable by having said curvature at the junction of the shanks and the vanes, considering the platforms closest to the disk, in particular on the downstream side.

In the context of the blade made of woven composite, the geometry according to the invention makes it possible to soften and to distribute the curves closest to the axis of rotation, beginning with the junction between the shank and the vane in the flow. In fact, large or full curvatures are more complex to achieve in the context of composite blades with a woven matrix than in the context of metal blades.

In mathematical, this signifies that in the orthogonal frame of reference such that BA has (0,0) and BF (0,1) as coordinates, the equation of the skeleton is given by a function f defined on the interval [0; 1] such that $f(0)=f(1)=0$ and $\exists x_{MAXcamber} \in [0.55; 1]$, $\forall x \in [0; 1]$, $f(x_{MAXcamber}) \geq f(x)$.

It should be noted that the skeleton is generally an increasing, then decreasing function in terms of camber. The maximum camber therefore corresponds to a tangent to the skeleton parallel to the chord, i.e. $f'(x_{MAXcamber})=0$.

Advantageously, the maximum camber is associated with a position corresponding to a relative chord length comprised between 55% and 75%, even between 55% and 65%. It is in fact noted that the best effects (see below) are obtained around 60%.

FIG. 5 compares an aerofoil with a low hub ratio according to the current state of the art and an aerofoil conforming to the present blade 3, "stacked." It is noted that the deferral of the maximum camber beyond 50% of chord makes it possible to limit the lower surface offset of the trailing edge BF which strongly penalizes the design of the shank. This makes it possible to both retain the deflection of the aerofoil which gives the compression ratio of the section, and to make a satisfactory junction to the root 31 with an axial aerofoil by means of the shank 32. More precisely, the present geometry makes it possible to better distribute curvature along the chord.

Thus, the present solution makes it possible to preserve the skeleton angles at the leading edge and at the trailing edge (and thus the compression ratio) of geometries of vanes 30 which were too curved for a root 31 with an axial aerofoil.

According to a second aspect, the invention relates to a fan 2 comprising a disk 4 (the spinner) and one or more blades (advantageously arranged regularly). Preferably, as explained, the root 31 of each blade 3 is inserted axially by translation into a pocket recess 40 of the disk 4.

It will be understood that only the vanes 30 will protrude from the surface of the disk 4 and from the volume determined by the platforms, the shanks 32 being arranged on the inside of the platforms so as not to protrude and not to be in contact with the fluid to be compressed. Thus, each shank extends outside the disk 4 and on the inside of platforms defining the interior of the stream.

A bypass turbine engine 1 is also proposed, equipped with such a fan 2.

The invention claimed is:

1. A fan blade of a bypass turbine engine, comprising:
   at least one shank; and
   a vane having a leading edge and a trailing edge,
   wherein, for at least one aerofoil of the vane in the vicinity of the shank, a maximum camber is associated with a position along said chord corresponding to a relative chord length of at least 55%, with an offset of said maximum camber toward the trailing edge, and
   wherein said position along the chord of the aerofoil associated with the maximum camber corresponds to a relative chord length comprised between 55% and 75%.

2. The blade according to claim 1, wherein said position along the chord of the aerofoil associated with the maximum camber corresponds to a relative chord length comprised between 55% and 65%.

3. The blade according to claim 1, being made of a woven composite material.

4. The blade according, to claim 1, further comprising a straight root connected to the vane with the shank.

5. A fan or a bypass turbine engine comprising at least one blade according to claim 1.

6. The fan according to claim 5, comprising a disk from which said blade extends substantially radially.

7. The fan according to claim 6, wherein the shank extends outside the disk and on inside of platforms defining an interior of a stream.

8. The fan according to claim 6, further comprising a straight root connected to the vane with the shank, wherein the root of the blade is inserted axially into a pocket recess of the disk.

9. The fan according to claim 6, comprising a plurality of blades positioned regularly over a circumference of the disk.

10. A bypass turbine engine comprising a fan according to claim 4.

11. The fan according to claim 1, wherein said at least one aerofoil of the vane presents said maximum camber being associated with a position along said chord corresponding to a relative chord length of at least 55%, with the offset of said maximum camber toward the trailing edge, over less than 5% of a height of the at least one aerofoil.

* * * * *